United States Patent
Riedisser et al.

(10) Patent No.: US 11,098,768 B2
(45) Date of Patent: Aug. 24, 2021

(54) INNER DISC-CARRIER FOR WET-TYPE FRICTION-CLUTCH

(71) Applicant: ZF Friedrichshafen AG, Friedrichshafen (DE)

(72) Inventors: Thomas Riedisser, Sigmarszell (DE); Steffen Einenkel, Priesendorf (DE); Christian Dönges, Friedrichshafen (DE); Klemens Adamski, Mandelbachtal (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 9 days.

(21) Appl. No.: 16/591,784

(22) Filed: Oct. 3, 2019

(65) Prior Publication Data
US 2020/0116208 A1 Apr. 16, 2020

(30) Foreign Application Priority Data
Oct. 11, 2018 (DE) ...................... 10 2018 217 384.2

(51) Int. Cl.
*F16D 13/68* (2006.01)
*F16D 13/74* (2006.01)
*F16D 13/52* (2006.01)

(52) U.S. Cl.
CPC ........... *F16D 13/683* (2013.01); *F16D 13/52* (2013.01); *F16D 13/74* (2013.01); *F16D 2250/0023* (2013.01)

(58) Field of Classification Search
CPC ........ F16D 13/683; F16D 13/74; F16D 13/52; F16D 2250/003; F16D 25/123; F16D 25/0638; F16D 13/72; F16D 2250/0023; B21D 53/88; B21D 22/14
See application file for complete search history.

(56) References Cited

U.S. PATENT DOCUMENTS

| 2015/0292613 A1* | 10/2015 | Tonokura | ............ F16H 57/0484 475/159 |
| 2018/0180113 A1* | 6/2018 | Tokito | ................. F16H 57/0473 |

FOREIGN PATENT DOCUMENTS

| DE | 102014224368 | * | 9/2015 |
| DE | 102014118132 B3 | | 3/2016 |
| DE | 102016223019 A1 | | 5/2018 |

OTHER PUBLICATIONS

Machine language translation of Werner DE102014118132.*
Machine language translation of Fink DE102014224368.*

* cited by examiner

*Primary Examiner* — Mark A Manley
(74) *Attorney, Agent, or Firm* — Dority & Manning, P.A.

(57) ABSTRACT

An inner disc carrier (LT) for a wet-type friction clutch (K0) may have a driving toothing including ridges (S, SX) and grooves (N) for the form-locking accommodation of discs (L) of the friction clutch (K0). Each of a first group of the ridges (S) has a first opening (A1) produced in a chip-less shaping process and a section (ST) extending radially inwardly at the first opening (A1) and created during production of the first opening (A1). Hydraulic fluid supplied radially from inside the inner disc carrier (LT) from a first axial position is guided through the first openings (A1) to the discs (L). Hydraulic fluid supplied radially from inside the inner disk carrier (LT) from a second axial position is guided past the discs (L). The sections (ST) of the ridges (S) act as a damming contour for hydraulic fluid supplied radially from the second axial position.

20 Claims, 8 Drawing Sheets

Fig. 10

INNER DISC-CARRIER FOR WET-TYPE FRICTION-CLUTCH

FIELD OF THE INVENTION

The application relates generally to an inner disc-carrier for a wet-type friction-clutch, and to a wet-type friction-clutch having such an inner disc-carrier. The application also relates generally to a drive train unit for a motor vehicle having such a friction-clutch.

BACKGROUND

DE 10 2016 223 019 A1 describes an actuating device for actuating a shift element of a transmission, which is a multi-disk clutch. According thereto, depending on a position of an actuation of the shift element, oil is guided through the disks of the shift element for cooling or is guided past the disks of the shift element. The oil guidance takes place, at least partially, through openings in an inner disk carrier of the shift element.

The problem addressed by the invention is now that of providing an inner disc carrier suitable for an actuating device according to the prior art.

SUMMARY OF THE INVENTION

An inner disc carrier for a wet-type friction clutch is provided, the inner disc carrier having a driving toothing including ridges and grooves for the form-locking accommodation of discs of the friction clutch. The disc carrier is designed such that hydraulic fluid supplied radially from inside the disc carrier from a first axial position is guided to the discs, and that hydraulic fluid supplied radially from inside the disc carrier from a second axial position is guided past the discs. The first axial position differs from the second axial position.

According to the invention, it is provided that each of at least a first group of the ridges has a first opening produced in a chip-less shaping process. The first openings are produced, for example, by cutting, punching, or punching and bending. Hydraulic fluid supplied from the first axial position can be guided to the discs through the first openings. The first openings therefore form a fluid passage between a radial inner side and a radial outer side of the inner disc carrier. The openings are not produced by completely punching out material of the ridges. Instead, it is provided that radially inward-shaped sections of the ridges are retained as the first openings are produced. These sections act as a damming contour for hydraulic fluid supplied from the second axial position.

If the inner disc carrier rotates about its axis of rotation and hydraulic fluid is supplied to the inner disc carrier from radially inside of the inner disc carrier, the supplied hydraulic fluid accumulates on the radial inner side of the ridges due to the centrifugal force and, in fact, largely independently of the axial position of the hydraulic fluid supply. Due to the radially inward-shaped sections of the ridges, an outflow of hydraulic fluid, which is to be guided past the discs, is prevented from flowing in the direction of the discs. In the same way, the radially inward-shaped sections reduce an outflow of hydraulic fluid, which is to be guided to the discs, to the fluid path extending past the discs. Due to the embodiment according to the invention, the machining of the inner disc carrier is reduced or even entirely avoided. This reduces the manufacturing costs of the inner disc carrier.

Preferably, each of a second group of the ridges has a second opening. Hydraulic fluid supplied from the first axial position is guided to the discs through the second openings. The second openings, as is the case with the first openings, therefore form a fluid passage between a radial inner side and a radial outer side of the inner disc carrier. The second openings are arranged at a different axial position of the inner disc carrier than the first openings, however. Due to such an embodiment, a more uniform supply of hydraulic fluid to the discs is achieved.

According to a preferred embodiment, the ridges that have the second opening also include a radially inwardly-directed indentation. These indentations perform the same function as the sections of the radially inward-shaped ridges, which are formed during the production of the first openings. The indentations therefore act as a damming contour for hydraulic fluid, which, originating from the first axial position, is supplied to the radial inner side of the inner disc carrier.

The second openings and/or the indentations are produced in the chip-less shaping process. During the production of the indentations, an opening can form between the radial inner side and the radial outer side of the inner disc carrier. An embodiment is preferred, however, in which no such opening forms during the production of the indentations. Due to the identical method for producing the first openings as well as the second openings, or the indentations, an inner disc carrier formed in such a way is particularly cost-effectively manufactured.

Preferably, a radially inward-directed damming contour is provided on an axial end of the ridges that include the first opening or the second opening. This damming contour reduces the outflow of hydraulic fluid, which is to be guided to the discs, via the axial end of the ridges. The damming contour is formed, for example, with the aid of an axial caulking of the inner disc carrier.

According to a preferred embodiment, at least a few of the ridges each includes a third opening. Hydraulic fluid, which, originating from the second axial position, is supplied to the radial inner side of the inner disc carrier, is guided past the discs through the third openings. Preferably, all of the ridges include such a third opening. Preferably, the third openings are produced in the chip-less shaping process, i.e., for example, with the aid of punching.

Preferably, the inner disc carrier includes a cylindrical section and a flange section adjoining the cylindrical section. The inner disc carrier is attachable to a shaft via the flange section. The driving toothing including the ridges and grooves is formed on the cylindrical section. The third openings are preferably arranged in the transition area between the cylindrical section and the flange section.

According to a further embodiment, a third group of the ridges are imperforate such that each of the ridges of the third group includes no openings through which hydraulic fluid from the radial inner side can reach the radial outer side of the inner disc carrier. Hydraulic fluid, which, originating from the second axial position, is supplied to the radial inner side of the inner disc carrier, is guided past the discs with the aid of the ridges associated with the third group.

The inner disc carrier according to the above-described embodiments is a component of a wet-type friction clutch. The wet-type friction clutch having such an inner disc carrier is a component of a drive train unit for a motor vehicle, i.e., for example, a transmission or a hybrid module between the internal combustion engine and the transmission.

For example, the friction clutch is usable for the engageable force transmission or selective engagement between an internal combustion engine of the motor vehicle and an electric machine or motor of the drive train unit. For such an application, it is particularly advantageous to guide hydraulic fluid past the discs of the friction clutch in the disengaged condition of the friction clutch in order to reduce the drag torques of the friction clutch.

BRIEF DESCRIPTION OF THE DRAWINGS

Exemplary embodiments of the invention are described in detail in the following with reference to the attached figures. Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
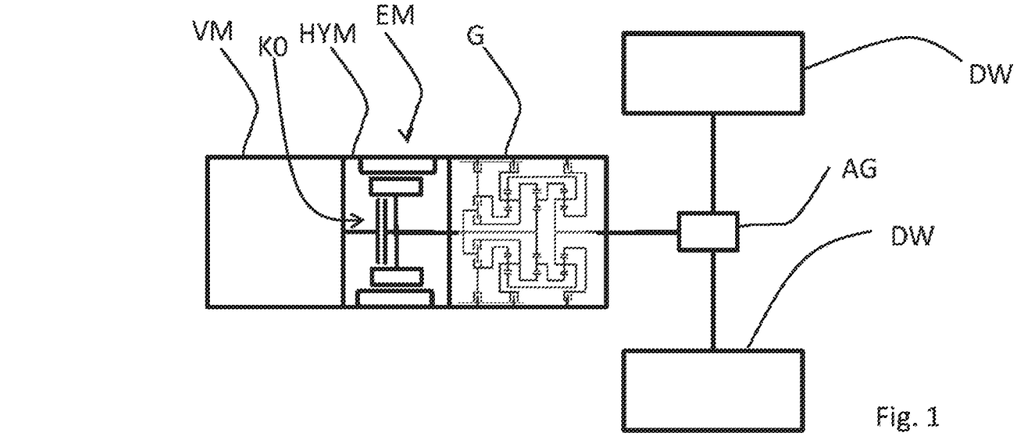
FIG. 1 illustrates one embodiment of a drive train for a motor vehicle.

FIG. 1 schematically shows a drive train for a motor vehicle including a hybrid drive. The drive train includes an internal combustion engine VM, a transmission G, and a hybrid module HYM arranged therebetween. The hybrid module HYM has an electric machine or motor EM and a friction clutch K0. A rotor of the electric machine EM is connected to an input shaft of the transmission G. The friction clutch K0 is utilized for engageably or selectively coupling the internal combustion engine VM to the transmission G. The transmission G has, for example, multiple planetary gear sets and shift elements. Due to selective actuation of the shift elements, multiple gear steps are engageable between the input shaft and an output shaft of the transmission G with the aid of the planetary gear sets. The output shaft of the transmission G is connected to a differential gear AG, for example, via a drive or cardan shaft. The power present at the output shaft is distributed to driving wheels DW of the motor vehicle via the differential gear AG. The drive train is oriented longitudinally with respect to the direction of travel of the motor vehicle.

Figure 2:
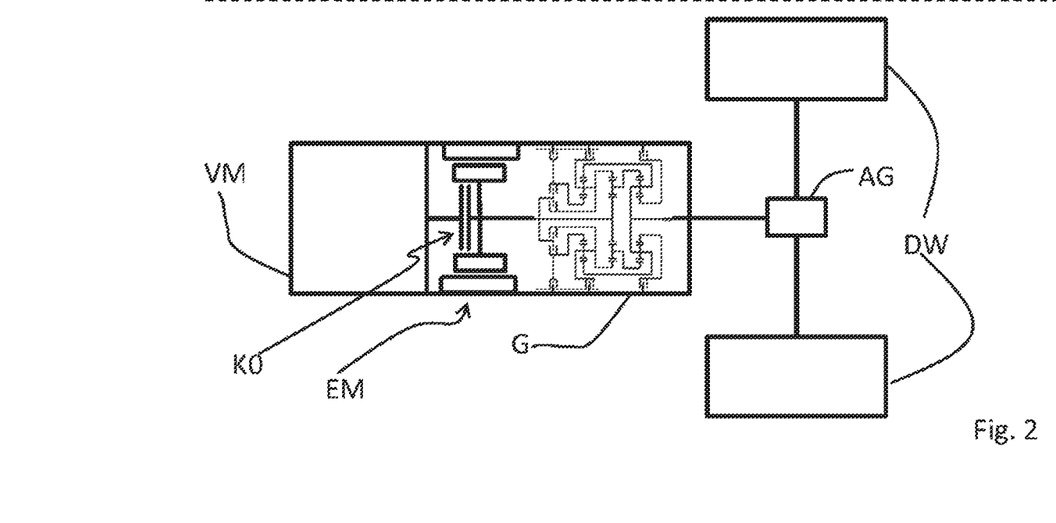
FIG. 2 illustrates another embodiment of a drive train for a motor vehicle.

FIG. 2 schematically shows a drive train for a motor vehicle, which essentially corresponds to the drive train represented in FIG. 1, except that the electric machine EM as well as the friction clutch K0 are now integrated into the transmission G. As such, the hybrid module is therefore omitted.

The drive trains represented in FIG. 1 and FIG. 2 are to be considered merely as examples. Instead of the planetary gear sets, spur gear stages or a toroidal drive could be utilized for implementing gears. A torque converter could be utilized as the starting component, for example, between the rotor of the electric machine EM and the input shaft of the transmission G. The drive train could be aligned transversely to the direction of travel of the motor vehicle.

Figure 3:
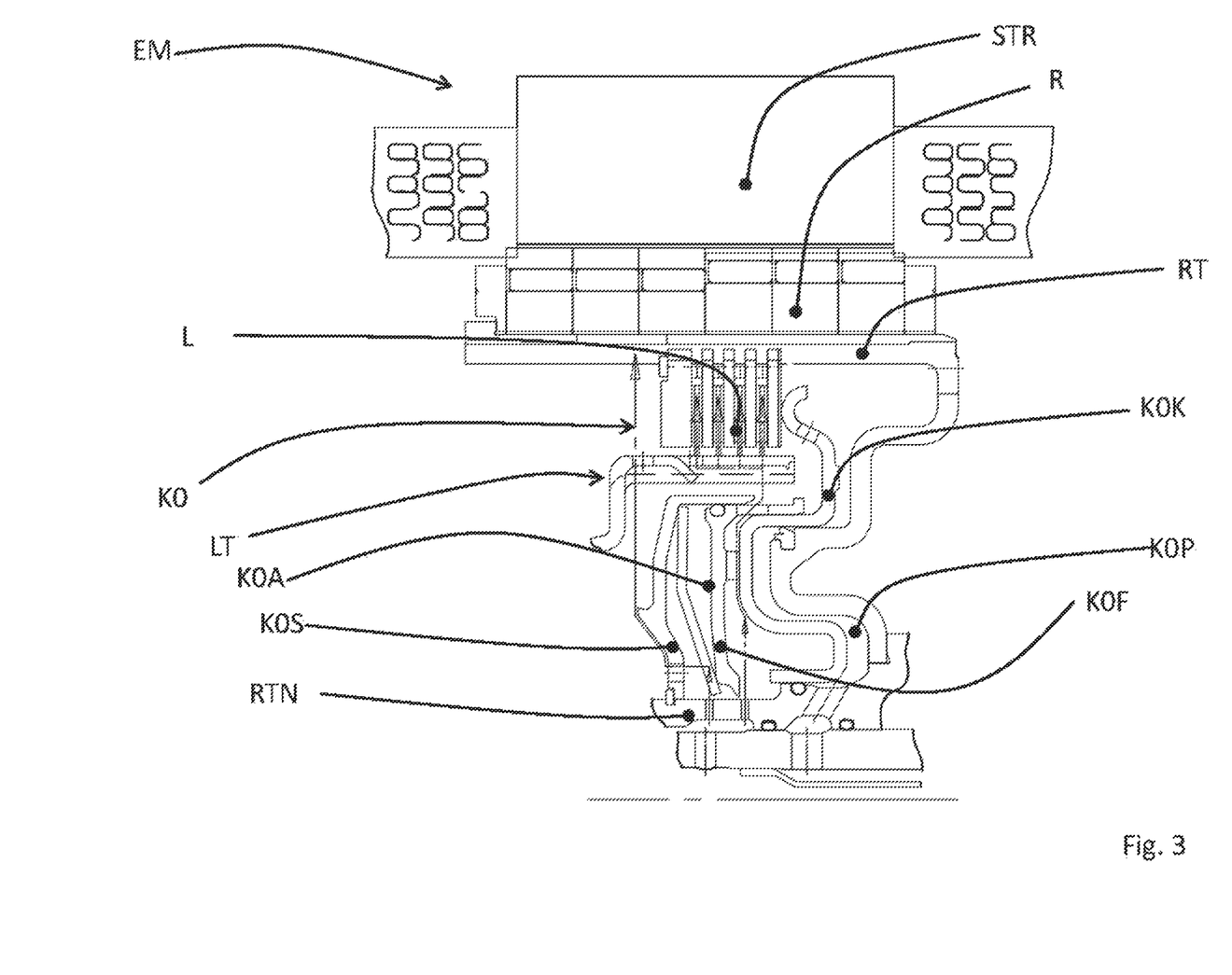
FIG. 3 shows a partial, section view of a drive train, particularly illustrating a friction clutch of the drive train in an engaged position such that oil is supplied to discs of the friction clutch.

FIG. 3 shows a partial, section view through the drive train represented in FIG. 1 or FIG. 2, particularly illustrating the configuration of the electric machine EM and of the friction clutch K0. The electric machine EM has a rotationally fixed stator STR and a rotating rotor R. The rotor R is connected to a rotor carrier RT. The friction clutch K0 is a hydraulically actuated, wet-type multi-disc clutch, which has multiple discs L. The rotor carrier RT acts as a disc carrier for the outer discs L of the friction clutch K0. An inner disc carrier LT is provided for accommodating the inner discs L of the friction clutch K0. The friction clutch K0 is engageable via pressurization of a pressure chamber K0P. Due to the build-up of a pressure in the pressure chamber K0P, a piston K0K acts in the axial direction on the discs L. If the pressure in the pressure chamber K0P is decreased, the piston K0K is displaced into an initial position with the aid of a recoil spring. The recoil spring is arranged within a pressure compensating cavity K0A, which is utilized for compensating the rotational forces acting in the pressure chamber K0P. The pressure compensating cavity K0A is delimited, in sections, by a disc K0S and a guide element K0F. The friction clutch K0 is represented in FIG. 3 in the actuated or engaged, i.e., torque-transmitting condition.

The oil supply to the friction clutch K0 is represented in greater detail in FIG. 3. Three oil ducts are formed in a hub RTN connected to the rotor carrier RT. The oil duct arranged on the right in FIG. 3 is utilized for supplying oil to the pressure chamber K0P. The two remaining oil ducts are utilized for supplying oil to the pressure compensating cavity K0A and for supplying cooling oil to the discs L. In the actuated condition of the friction clutch K0, the guide element K0F releases an oil path between the guide element K0F and the piston K0K, so that oil is guided to the discs L via the inner disc carrier LT. The corresponding oil path is represented in FIG. 3 with the aid of arrows. Oil is fed to the pressure compensating cavity K0A via a further oil path. If the pressure compensating cavity K0A has been sufficiently filled, further supplied oil emerges via an opening in the disc K0S, and is slung radially outward to the inner disc carrier LT. The corresponding oil path is represented in FIG. 3 with the aid of arrows.

Figure 4:
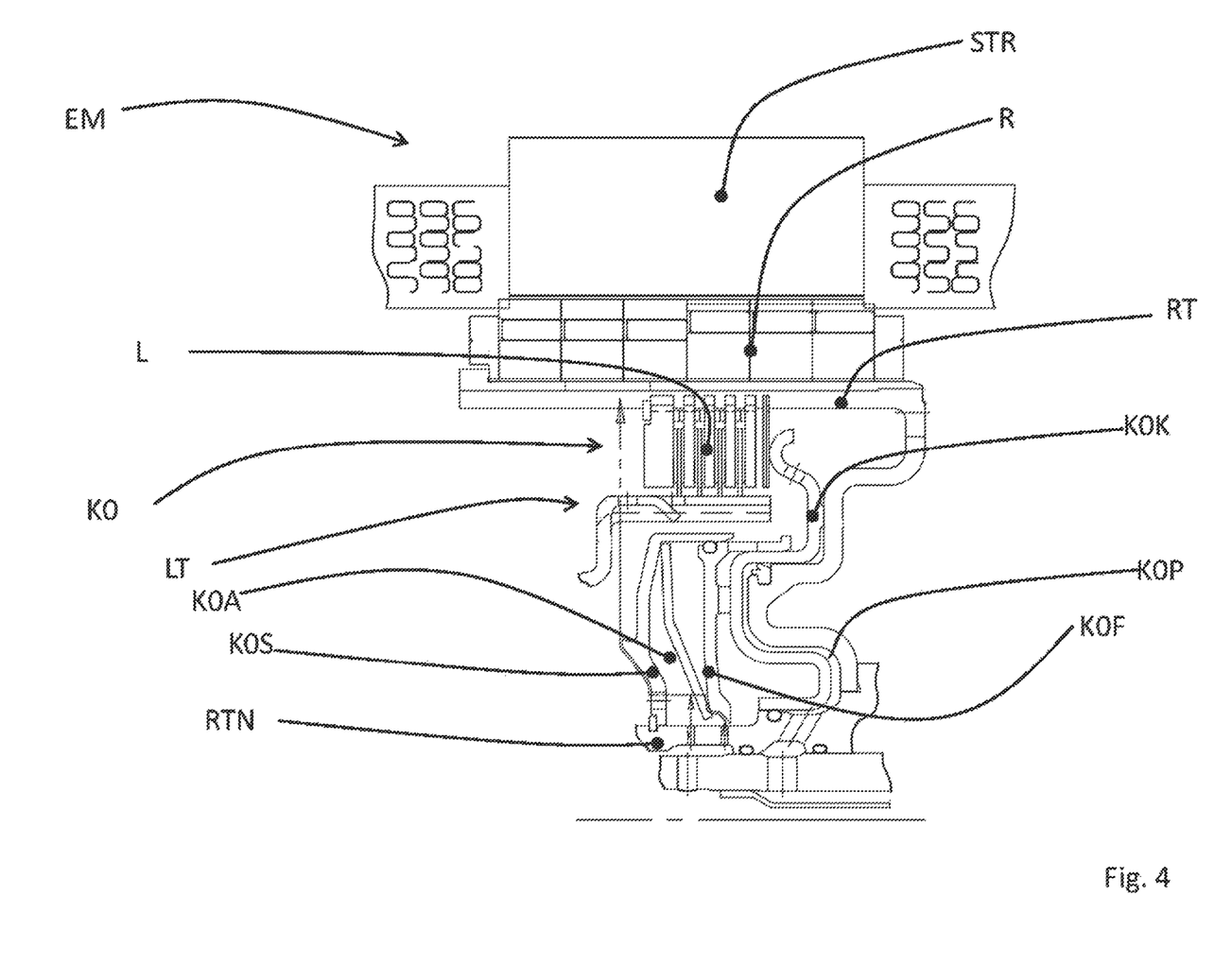
FIG. 4 shows another partial, section view of the drive train shown in FIG. 3, particularly illustrating the friction clutch of the drive train in a disengaged position such that oil is supplied to an inner disc carrier of the friction clutch.

FIG. 4 shows a partial, section view through the drive train represented in FIG. 1 or FIG. 2, which essentially corresponds to the section view represented in FIG. 3, except that the friction clutch K0 is represented in FIG. 4 in the unactuated or disengaged, i.e., non-torque-transmitting, condition. In this position of the piston K0K and of the guide element K0F, the two left oil ducts of the hub RTN feed oil to the oil path that supplies the pressure compensating cavity K0A. A supply of oil to the discs L is undesirable in this condition, since this would increase the drag torque of the friction clutch K0. The corresponding oil path, which extends past the discs L, is represented in FIG. 4 with the aid of arrows.

Figure 5:
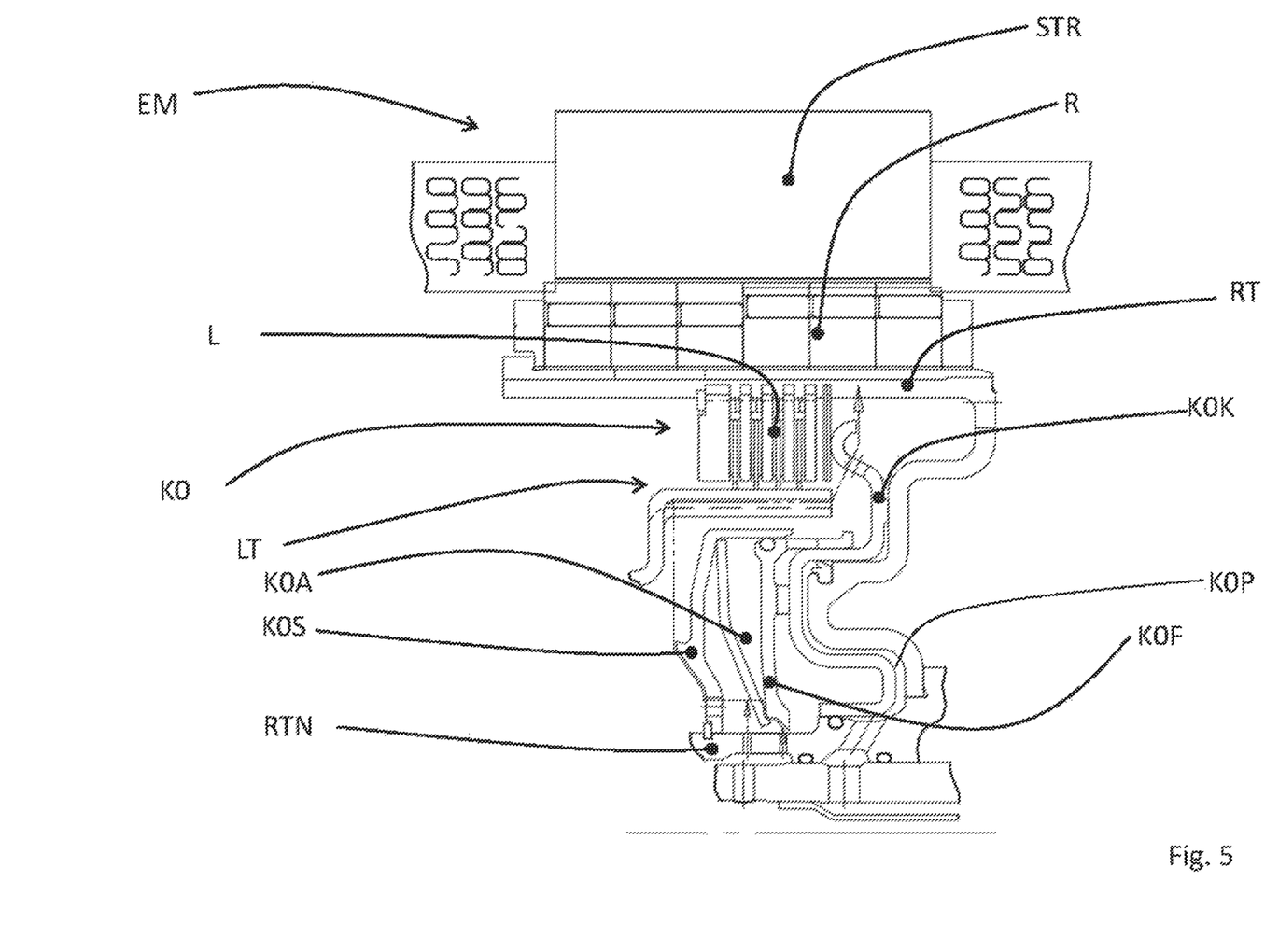
FIG. 5 shows a further partial, section view of the drive train shown in FIG. 3, particularly illustrating the friction clutch of the drive train in a disengaged position such that oil is supplied to a stator of the drive train.

FIG. 5 shows a partial, section view through the drive train represented in FIG. 1 or FIG. 2, which essentially corresponds to the section view represented in FIG. 4, with the friction clutch K0 being represented in the unactuated, i.e., non-torque-transmitting, condition. However, the inner disc carrier LT is now designed such that oil flowing from the pressure compensating cavity K0A is collected on the inner side of the inner disc carrier LT and guided past the discs L along the inner side. The oil is then slung off on the free end of the inner disc carrier LT to reach an inner side of the rotor carrier RT through bore holes in the piston K0K. From there, the oil reaches the stator STR through openings in the rotor carrier RT. The corresponding oil path is represented in FIG. 5 with the aid of arrows.

As is clearly apparent from the representations according to FIG. 35, oil is fed to a radial inner side of the inner disc carrier LT from a first axial position and/or from a second axial position. Oil fed from the first axial position (right oil path in the hub RTN) is to be fed to the discs L. Oil fed from the second axial position (left oil path in the hub RTN) is to be guided past the discs L. The following figures show exemplary embodiments for the structural configuration of the inner disc carrier LT, which allow for such an oil guidance.

Figure 6:
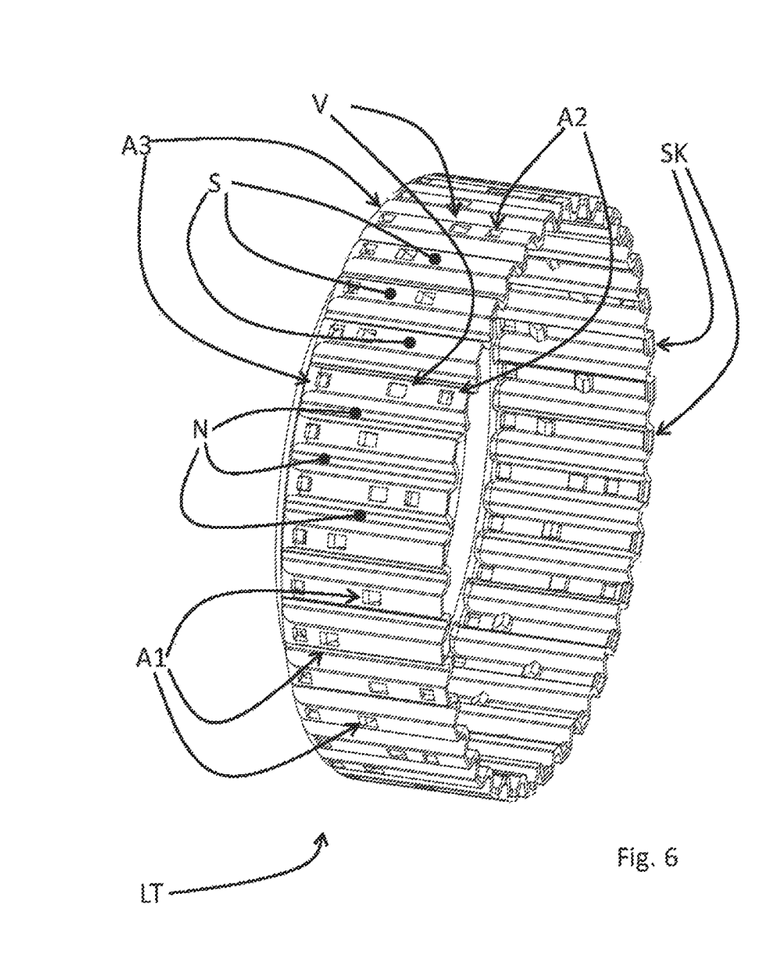
FIG. 6 shows an isometric view of an inner disc carrier according to a first exemplary embodiment.
Figure 7:
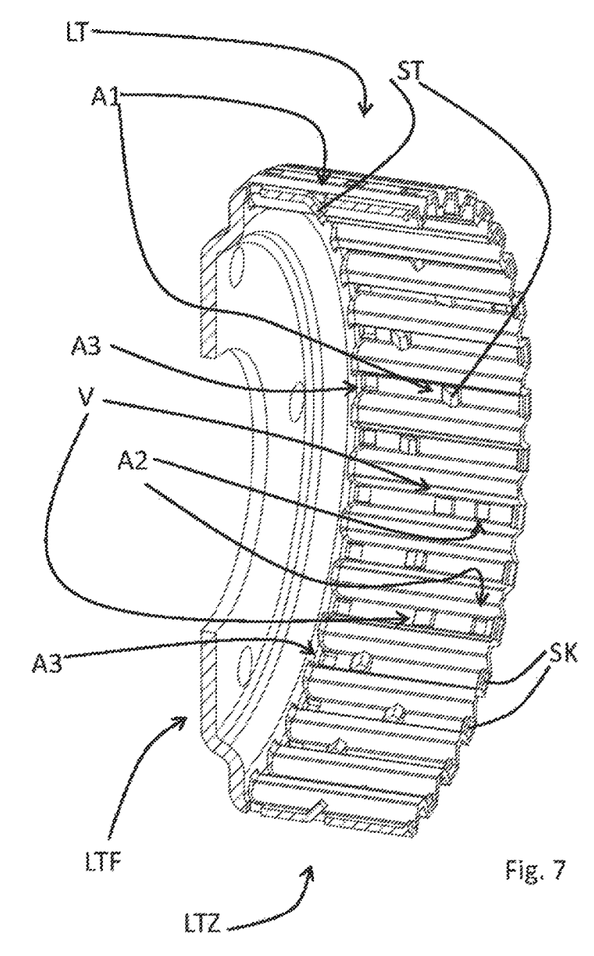
FIG. 7 shows a partial, perspective view of the inner disc carrier shown in FIG. 6.

FIG. 6 shows an isometric view of the inner disc carrier LT according to a first exemplary embodiment. FIG. 7 shows a partial, perspective view of the inner disc carrier LT shown in FIG. 6. The inner disc carrier LT has a driving toothing for the form-locking accommodation of discs not represented in FIG. 6. The driving toothing is arranged on a cylindrical section LTZ of the inner disc carrier LT and consists of ridges S and grooves N.

Each of a first group of the ridges S includes a first opening A1. The openings A1 are produced in a chip-less shaping process, for example, by punching or punching and bending. During the production of the openings A1, a section ST of the affected ridges S is shaped to extend radially inwardly. An axial end of the ridges S including the first opening A1 has a radially inward-directed damming contour SK, which is formed in this case as an axial caulking, by way of example.

Each of a second group of the ridges S includes a second opening A2. The second openings A2 are arranged at different axial position of the inner disc carrier LT than the first openings A1 and, in this case, are punched through, for example. The ridges S including the second opening A2 also have a radially inwardly directed indentation V. An axial end of each of the ridges S including the second opening A2 also has a radially inwardly directed damming contour SK, which is formed in this case as an axial caulking, by way of example.

In the exemplary embodiment of the inner disc carrier LT according to FIG. 6 and FIG. 7, the ridges S belong to either the first group or to the second group. In other words, each of the ridges S includes either the first opening A1 or the second opening A2. Each of the ridges S also includes a third opening A3, which is arranged in the transition area between the cylindrical section LTZ and a flange section LTF of the inner disc carrier LT. The number of openings A1, A2, A3 depends, of course, on the flow which is to be guided through the openings A1, A2, A3. In the case of a low flow requirement, the number of openings A1, A2, A3 is reduced accordingly.

Figure 8:
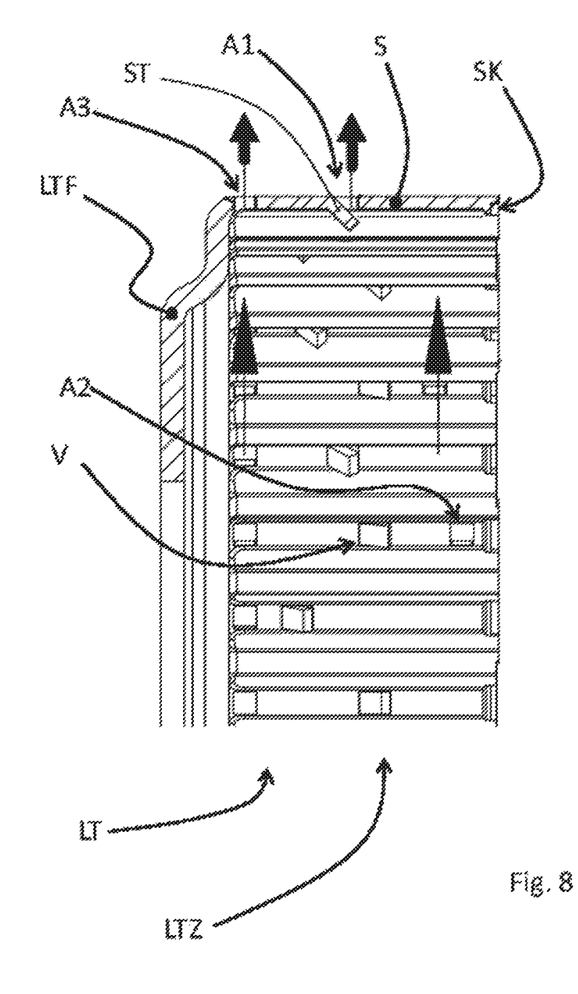
FIG. 8 shows another partial, perspective view of the inner disc carrier shown in FIG. 6.

FIG. 8 shows a further partial, section view of the inner disc carrier LT according to the exemplary embodiment represented in FIG. 6 and FIG. 7, wherein the section plane extends through a ridge S including the first opening A1. The oil supply from two axial positions toward the inner side of the inner disc carrier LT is illustrated with the aid of arrows. It is clearly apparent from FIG. 8 that the radially inward-shaped section ST of the first opening A1 acts as a damming contour for the oil that is fed from the axial position represented on the left in FIG. 8. The section ST therefore reduces the amount of oil, which, originating from the oil supply arranged on the left, reaches the discs L through the first opening A1. The oil fed from the position represented on the right in FIG. 8 toward the inner side of the inner disc carrier LT can reach the discs L through the first opening A1. The damming contour SK reduces an excessive outflow of this oil via the right axial end of the inner disc carrier LT.

Figure 9:
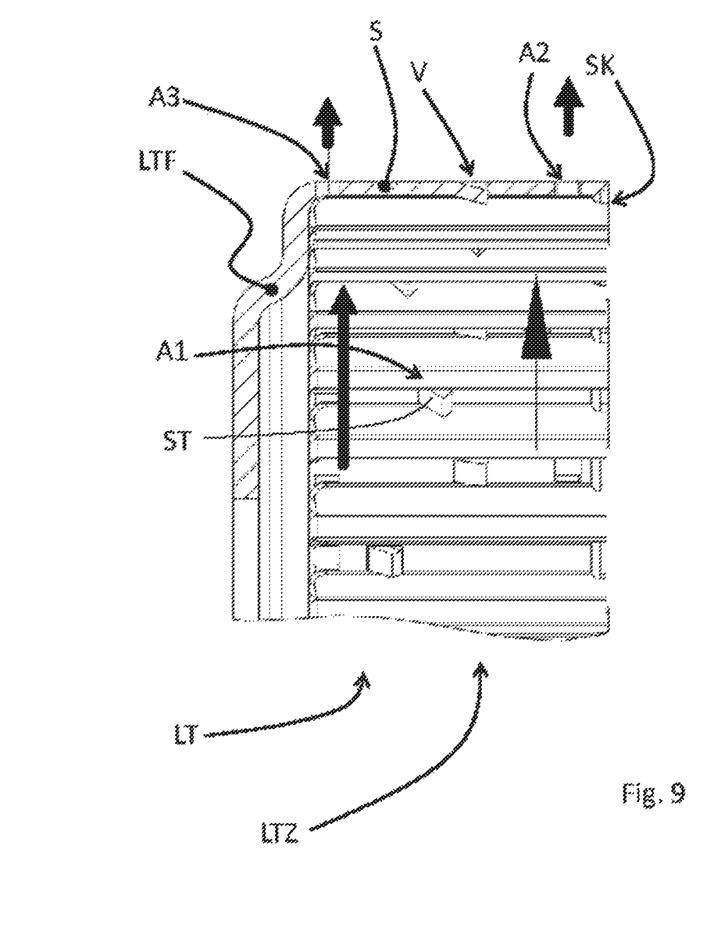
FIG. 9 shows yet another partial, perspective view of the inner disc carrier shown in FIG. 6.

FIG. 9 shows a sectional view of the inner disc carrier LT according to the exemplary embodiment represented in FIGS. 6-8, wherein the section plane extends through a ridge S including the second opening A2. The oil supply from two axial positions toward the inner side of the inner disc carrier LT is illustrated again with the aid of arrows. It is clearly apparent from FIG. 9 that the radially inward-directed indentation V acts as a damming contour for the oil that is fed from the axial position represented on the left in FIG. 9. The indentation V therefore reduces the amount of oil, which, originating from the oil supply arranged on the left, reaches the discs L through the second opening A2. The indentation V is produced with the aid of local crimping, so that an opening is not formed by the indentation V. The second opening A2 is arranged to the right of the indentation V. Oil originating from the oil supply arranged on the right is guided through the second openings A2 to the discs L that are arranged to the right of the first openings A1. As a result, a particularly uniform oil supply to the discs L is made possible. The damming contour SK reduces an outflow of this oil via the right axial end of the inner disc carrier LT.

Figure 10:
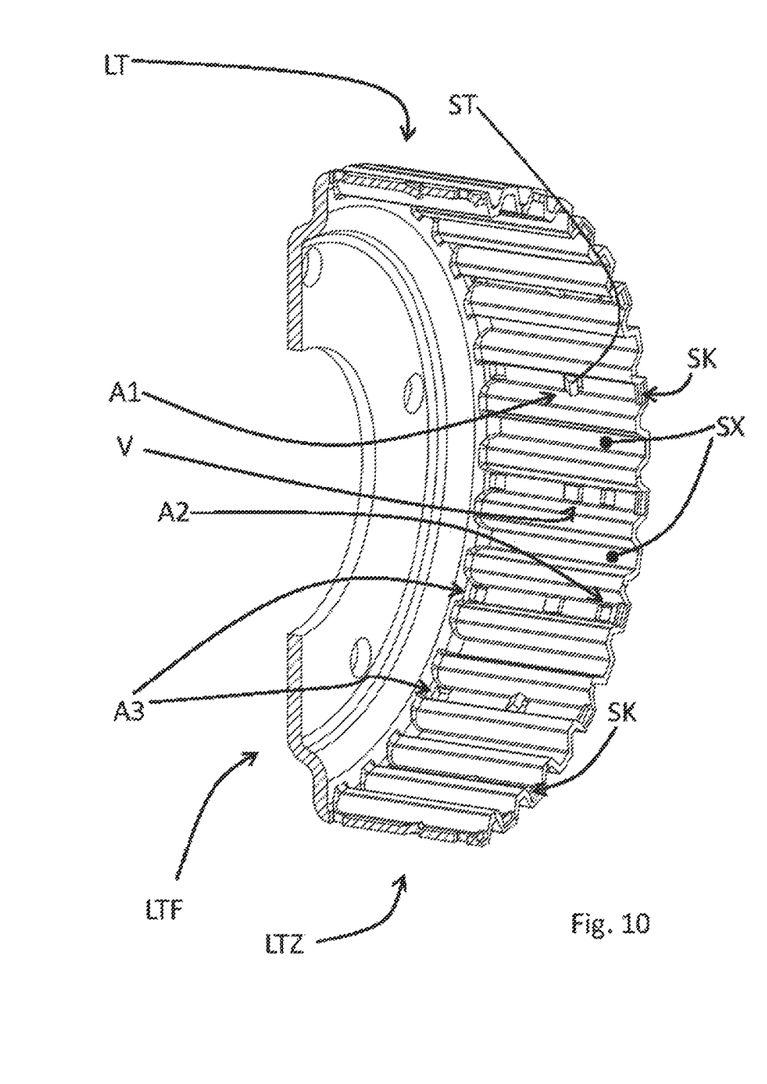
FIG. 10 shows a partial, isometric view of a second exemplary embodiment of an inner disc carrier.

FIG. 10 shows a partial, isometric view of a second exemplary embodiment of the inner disc carrier LT. In contrast to the inner disc carrier LT represented in FIGS. 6-9, the driving toothing now includes imperforate ridges SX, in which no openings are formed between the radial inner side and outer side of the inner disc carrier LT. These ridges SX also do not have an indentation or a damming contour on the free axial end.

Figure 11:
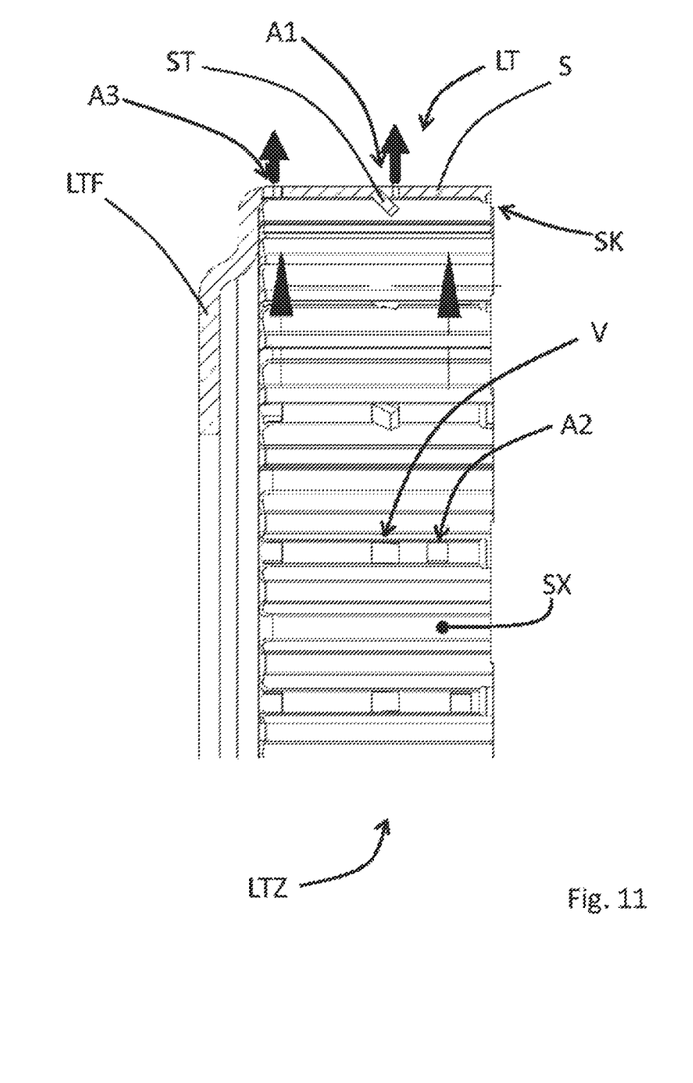
FIG. 11 shows a partial, perspective view of the inner disc carrier shown in FIG. 10.

FIG. 11 shows a partial, section view of the inner disc carrier LT according to the exemplary embodiment represented in FIG. 10, wherein the section plane extends through a ridge S having the first opening A1. The oil supply from two axial positions toward the inner side of the inner disc carrier LT is illustrated with the aid of arrows. It is clearly apparent from FIG. 10 that the ridges S having the first opening A1 also has the third opening A3. The ridges S having the second opening A2 also have the third opening A3.

Figure 12:
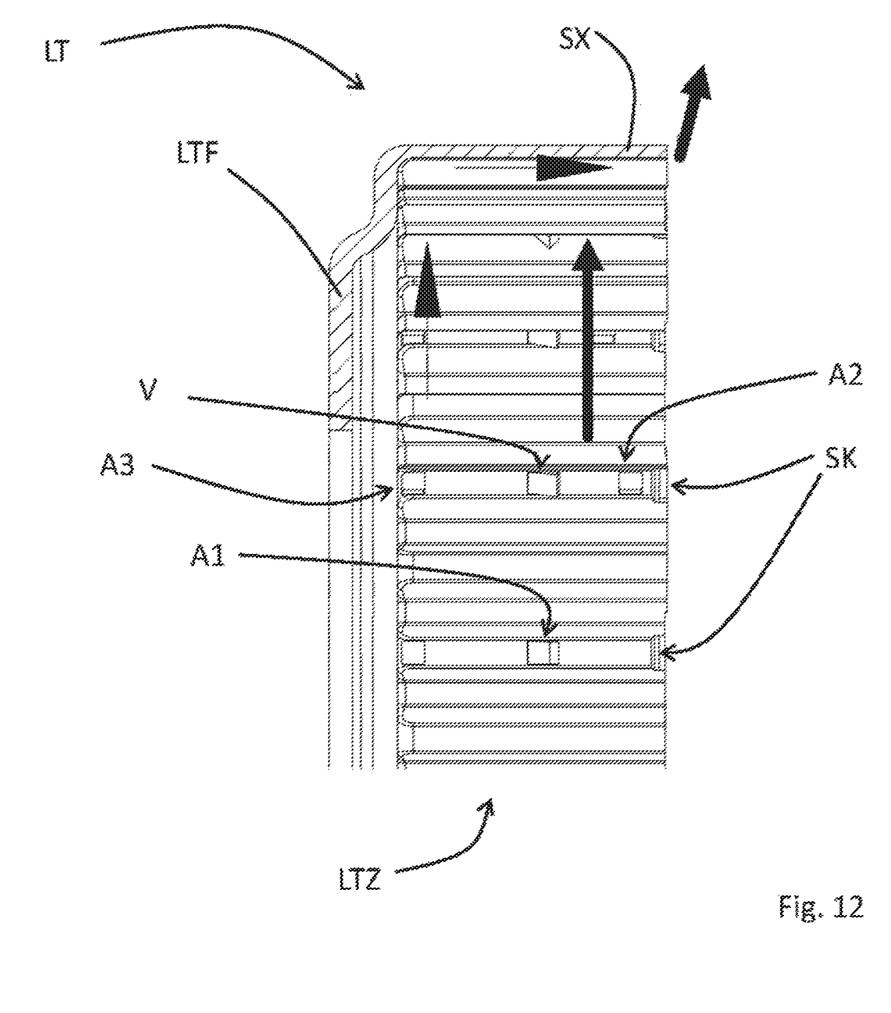
FIG. 12 shows another partial, perspective view of the inner disc carrier shown in FIG. 10.

FIG. 12 shows another partial, section view of the inner disc carrier LT according to the exemplary embodiment represented in FIGS. 10 and 11, wherein the section plane extends through a ridge SX without openings. The oil supply from two axial positions toward the inner side of the inner disc carrier LT is illustrated with the aid of arrows. Oil, which collects in the ridges SX, is slung radially outward on the free axial end of the inner disc carrier.

The inner disc carrier LT according to the above-described exemplary embodiments is not limited to an application for a friction clutch K0, which is functionally arranged between the internal combustion engine VM and the transmission input shaft. Instead, the inner disc carrier LT according to the invention is usable for friction clutches at various points of a motor vehicle drive train. Friction clutches are also understood to be, in this case, an engageable brake, in the case of which an outer disc carrier of the friction clutch is rotationally fixed.

Modifications and variations can be made to the embodiments illustrated or described herein without departing from the scope and spirit of the invention as set forth in the appended claims.

LIST OF REFERENCE CHARACTERS

VM internal combustion engine
HYM hybrid module
G transmission
AG differential gear
DW driving wheel
EM electric machine
STR stator
R rotor
RT rotor carrier
RTN hub
K0 friction clutch
K0K piston
K0P pressure chamber
K0F guide element
K0A pressure compensating cavity
K0S disk
LT inner disc carrier
S, SX ridge
N groove
A1 first opening
ST section
A2 second opening
V indentation
SK damming contour
A3 third opening
LTZ cylindrical section
LTF flange section

The invention claimed is:

1. An inner disc carrier (LT) for a wet-type friction clutch (K0), comprising:
a driving toothing including ridges (S, SX) and grooves (N) for form-locking accommodation of discs (L) of the friction clutch (K0), each of at least a first group of the ridges (S) comprises a first opening (A1) produced in a chip-less shaping process and a section (ST) extending radially inwardly at the first opening (A1) and created during production of the first opening (A1),
wherein hydraulic fluid supplied radially from inside the inner disc carrier (LT) from a first axial position is guided through the first openings (A1) to the discs (L),
wherein hydraulic fluid supplied radially from inside the inner disk carrier (LT) from a second axial position is guided past the discs (L), the second axial position being spaced apart from the first axial position,
wherein the sections (ST) of the first group of the ridges (S) form a damming contour for the hydraulic fluid supplied radially from the second axial position,
wherein each of a second group of the ridges (S) comprises a second opening (A2) through which the hydraulic fluid supplied from the first axial position is guided to the discs (L), wherein the second openings (A2) are arranged at a different axial position of the inner disc carrier (LT) than the first openings (A1), the second group of the ridges (S) being separate from the first group of the ridges (S), and
wherein each of the second group of the ridges (S) comprising the second openings (A2) includes a radially inward-directed indentation (V) forming a damming contour preventing the hydraulic fluid supplied from the second axial position from being guided through the second openings (A2), the indentations (V) being axially spaced from the second openings (A2).

2. The inner disc carrier (LT) of claim 1, wherein at least one of the second openings (A2) or the indentations (V) is produced by chip-less shaping.

3. The inner disc carrier (LT) of claim 1, wherein a radially inward-directed damming contour (SK) is provided on an axial end of at least one of the first group of the ridges (S) that comprise the first openings (A1) or the second group of the ridges (S) that comprise the second openings (A2).

4. The inner disc carrier (LT) of claim 3, wherein the damming contour (SK) is formed by an axial caulking of the inner disc carrier (LT).

5. The inner disc carrier (LT) of claim 1, wherein each of two or more of the ridges (S) comprises a third opening (A3) through which at least a portion of the hydraulic fluid supplied from the second axial position is guided past the discs (L).

6. The inner disc carrier (LT) of claim 5, wherein each of the ridges (S) comprises the third opening (A3).

7. The inner disc carrier (LT) of claim 5, wherein the third openings (A3) are produced by chip-less shaping.

8. The inner disc carrier of claim 5, further comprising a cylindrical section (LTZ) and a flange section (LTF) adjacent to the cylindrical section (LTZ),
wherein the driving toothing is formed on the cylindrical section (LTZ), and
wherein the third openings (A3) are positioned at a transition area between the cylindrical section (LTZ) and the flange section (LTF).

9. The inner disc carrier (LT) of claim 1, wherein each of a third group of the ridges (SX) is imperforate such that at least a portion of the hydraulic fluid supplied from the second axial position is guided past the discs (L) via the third group of ridges (SX), the third group of the ridges (SX) being separate from the first and second groups of the ridges (S).

10. The inner disc carrier (LT) of claim 9, wherein each of two or more of the first and second groups of the ridges (S) comprises a third opening (A3) through which at least a portion of the hydraulic fluid supplied from the second axial position is guided past the discs (L).

11. The inner disc carrier (LT) of claim 10, wherein the third openings (A3) are produced by chip-less shaping.

12. The inner disc carrier of claim 10, further comprising a cylindrical section (LTZ) and a flange section (LTF) adjacent to the cylindrical section (LTZ),
wherein the driving toothing is formed on the cylindrical section (LTZ), and wherein the third openings (A3) are positioned at a transition area between the cylindrical section (LTZ) and the flange section (LTF).

13. A wet-type friction clutch (K0), comprising the inner disc carrier (LT) of claim 1.

14. A drive train unit (HYM, G) for a motor vehicle, comprising the wet-type friction clutch (K0) of claim 13.

15. The drive train unit (HYM, G) of claim 14, wherein an internal combustion engine (VM) of the motor vehicle is selectively connectable to an electric motor (EM) of the drive train unit (HYM, G) via the friction clutch (K0).

16. A drive train unit (HYM, G) for a motor vehicle, comprising:
- a wet-type friction clutch (K0) having inner discs (L);
- an inner-disc carrier (LT) comprising a driving toothing including ridges (S, SX) and grooves (N) for form-locking accommodation of the inner discs (L) of the friction clutch (K0), each of at least a first group of the ridges (S) comprises a first opening (A1) produced in a chip-less shaping process and a section (ST) extending radially inwardly at the first opening (A1) and created during production of the first opening (A1); and
- a hydraulic fluid supply operable to generate a first radial flow of hydraulic fluid and a second radial flow of hydraulic fluid, the first radial flow being associated with a first axial position relative to the inner-disc carrier and the second radial flow being associated with a second axial position relative to the inner-disc carrier, the second axial position being spaced apart from the first axial position,
- wherein the first radial flow of hydraulic fluid is guided through the first openings (A1) to the discs (L),
- wherein the second radial flow of hydraulic fluid is guided past the discs (L), and
- wherein the sections (ST) of the first group of the ridges (S) form a damming contour for preventing the second radial flow of hydraulic fluid from being guided through the first openings (A1).

17. The drive train unit (HYM, G) of claim 16, wherein an internal combustion engine (VM) of the motor vehicle is selectively connectable to an electric motor (EM) of the drive train unit (HYM, G) via the friction clutch (K0), the electric motor (EM) having a rotor (R) and a stator (STR), the rotor (R) being rotatably supported by a rotor carrier (RT),
- wherein the second radial flow of hydraulic fluid is guided past the discs (L) to an inner side of the rotor carrier (RT).

18. The drive train unit (HYM, G) of claim 16, wherein the second axial position is axially spaced apart from the inner discs (L).

19. An inner disc carrier (LT) for a wet-type friction clutch (K0), comprising:
- a driving toothing including ridges (S, SX) and grooves (N) for form-locking accommodation of discs (L) of the friction clutch (K0), each of at least a first group of the ridges (S) comprises a first opening (A1) produced in a chip-less shaping process and a section (ST) extending radially inwardly at the first opening (A1) and created during production of the first opening (A1),
- wherein hydraulic fluid supplied radially from inside the inner disc carrier (LT) from a first axial position is guided through the first openings (A1) to the discs (L),
- wherein hydraulic fluid supplied radially from inside the inner disk carrier (LT) from a second axial position is guided past the discs (L), the second axial position being spaced apart from the first axial position,
- wherein the sections (ST) of the first group of the ridges (S) form a damming contour for the hydraulic fluid supplied radially from the second axial position,
- wherein each of a second group of the ridges (S) comprises a second opening (A2) through which the hydraulic fluid supplied from the first axial position is guided to the discs (L), the second openings (A2) being arranged at a different axial position of the inner disc carrier (LT) than the first openings (A1), the second group of the ridges (S) being separate from the first group of the ridges (S), and
- wherein each of two or more ridges (S) of the first and second groups of the ridges (S) comprises a third opening (A3) through which at least a portion of the hydraulic fluid supplied from the second axial position is guided past the discs (L), the third openings (A3) being axially aligned.

20. The inner disc carrier (LT) of claim 19, wherein each of the ridges (S) comprises the third opening (A3).

* * * * *